June 27, 1933.  J. E. SCHMELTZER  1,915,763
CUTTING TOOL
Filed July 27, 1929  2 Sheets-Sheet 2
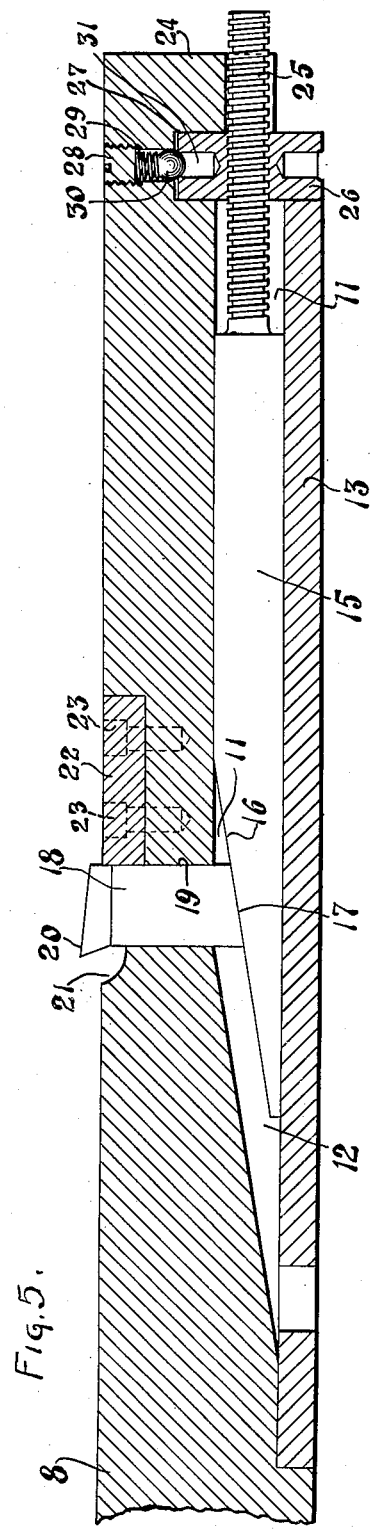
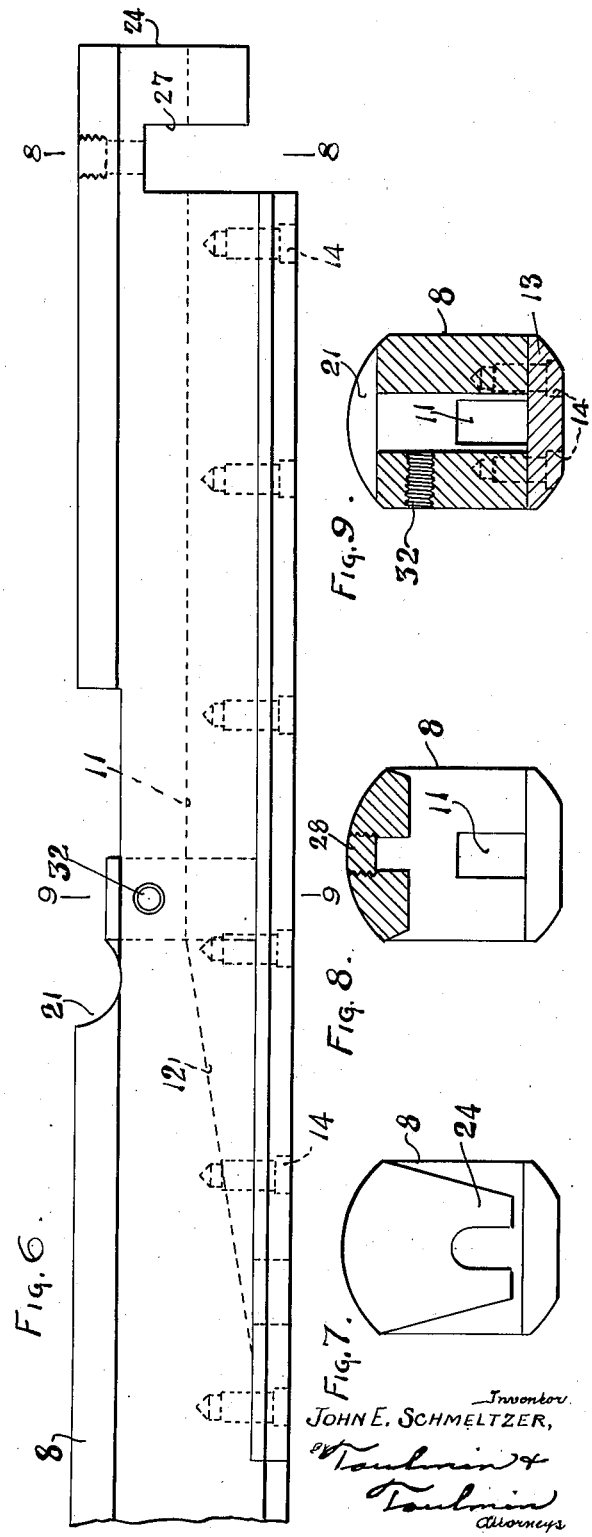
Inventor.
John E. Schmeltzer,
by Toulmin & Toulmin
Attorneys Patented June 27, 1933

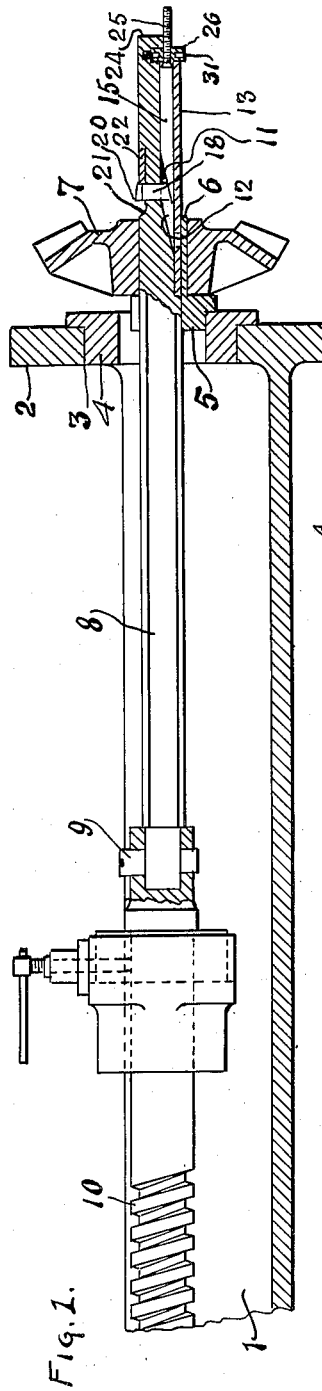
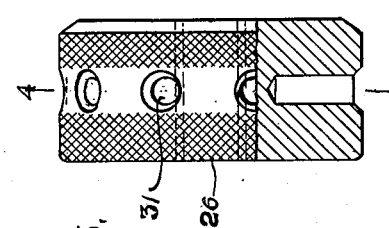
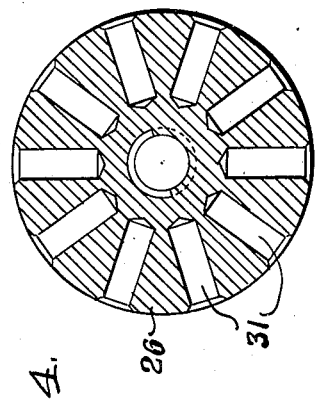
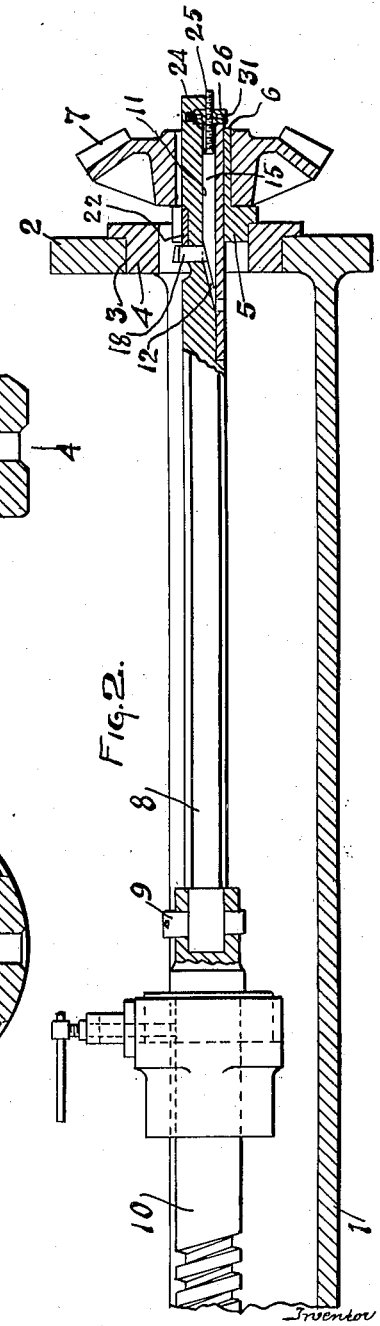

1,915,763

UNITED STATES PATENT OFFICE

JOHN E. SCHMELTZER, OF MARION, OHIO, ASSIGNOR TO THE MARION STEAM SHOVEL COMPANY, OF MARION, OHIO, A CORPORATION OF OHIO

CUTTING TOOL

Application filed July 27, 1929. Serial No. 381,525.

My invention relates to cutting tools.

It is the object of my invention to provide a cutting tool and adaptor for cutting very hard or tough metal, such as manganese steel, alloy steel or other materials, which are difficult to machine.

It is a further object to provide a support for a cutting tool so that the metal will be cut at each stroke of the tool and will not ride over the metal and glaze its surface.

It is the object of my invention to provide a tool support that will not allow the tool to spring away from the metal to be cut and which will not allow the tool to chatter.

In the accomplishment of the above objects, it is necessary that the tool be simple, strong and inexpensive to manufacture and not liable to get out of working order as the requirements of cutting such very hard or tough metals are most severe.

Referring to the drawings:

Figure 1 is a side elevation of the parts in position to start a cutting operation;

Figure 2 is a similar view showing the parts after a single cutting operation;

Figure 3 is a detail side elevation, partially in section, of the setting member for locking the tool;

Figure 4 is a section on the line 4—4 of Figure 3;

Figure 5 is a detail section through the tool holder showing the arrangement of the adjusting mechanism;

Figure 6 is a side elevation of the tool holder with the tool and adjusting mechanism removed;

Figure 7 is an end elevation of the tool holder;

Figure 8 is a section on the line 8—8 of Figure 6;

Figure 9 is a section on the line 9—9 of Figure 6.

Referring to the drawings in detail, 1 indicates the body of a machine tool having a vertical face plate 2 provided with an aperture 3 in which is inserted a tool support 4 which, in turn, carries a work support 5 that also acts as a support through the sleeve 6 not only for the work 7 but also for the end of the tool holder 8.

The tool holder 8 is attached by the pin 9, or by any other suitable mechanism to the actuating screw 10 operated in any desired manner.

The work is shown as a bevel gear, for instance, of manganese steel, in which it is desired to cut a keyway.

The work holder 8 is provided with a groove 11 tapered at its forward end as at 12. This groove is closed by the plate 13 suitably attached by bolts 14 or machine screws. Thus, a channel passageway is provided for a reciprocating screw-operated wedge 15 having a forward tapered face 16 for engaging with the lower tapered face 17 of a vertically-disposed cutting tool 18 located within a vertically-disposed guide way 19 in the tool holder. The wedging action of the wedge 16 serves to hold this tool in position. The tool is provided with a cutting nose 20 just in front of which is a cutaway space 21 in the tool holder to provide chip clearance  The back of the tool is supported by the detachable block 22 held in position by machine screws 23.

The rear end of the tool holder terminates in a downwardly-disposed, inverted jaw 24 through which freely reciprocates the screw 25, the forward end of which is attached to the block 15. On this screw is mounted an adjusting nut 26 which rotates through a slot 27 in the tool holder between the jaw 24 and that part of the tool holder adjacent the end of the passageway 11 and the plate 13.

Just over this slot 27 is a detachable screw plug 28 under which is a helical spring 29 resting upon a ball check 30 which in turn is supported in any one of a plurality of apertures 31 in the periphery of the knurled adjusting nut 26. By turning this nut the adjustment of the tool 18 is effected by the movement of the tapered surface 16 of the wedge with relation to the inner end of the tool, which rests thereon, it being understood that the tool is free to move vertically in its guideway under the control of the wedge. If desired, a lateral set screw 32 may be provided for engaging the side of the tool 18, such set screw being carried in the side wall of the tool holder 8.

It will be noted that the several parts are so arranged that the tool only passes through the work or across the work once.

It is desired to avoid the tool riding over the surface of the metal and glazing it. As manganese steel is a flowing metal, it is not desirable to return the tool holder with the cutting tool in position due to the liability of breaking off the cutting edge of the tool, as it has been found that one passage of the tool while cutting is preferable. The tool is removed after this cutting operation and the tool supporting bar is returned to the position shown in Figure 1 where the tool is reinserted, adjusted to the proper height by rotating the nut 26, locked in position and a new and deeper cut taken. This operation being repeated until the cut is completed as desired.

The wedging bar 15 acts as a regulator of the depth of second feed as well as a means for holding the tool against inward movement during the cutting operation.

It will be understood that I desire to comprehend within my invention such modifications as may be necessary to adapt it to varying conditions and uses.

Having thus fully described my invention, what I claim as new and desire to secure by Letters Patent, is:—

1. In a device of the character described, a longitudinally movable tool supporting bar having a longitudinal groove in one side thereof and having an opening extending from said groove through the opposite side thereof, a cutting tool adjustably mounted in said opening and extending into said groove, a reciprocatory block mounted in said groove and having an inclined surface in supporting engagement with said tool, a plate secured to said bar to close said groove and support said block therein, said bar having a part extending transversely to said groove at one end thereof and provided with an opening in line with said groove, a screw rigidly connected with said block and extending loosely through the opening in said transverse part, and a rotatable nut threaded on said screw and arranged between said transverse part and an adjacent portion of said bar.

2. In a device of the character described, a longitudinally movable tool supporting bar having a longitudinal groove in one side thereof and having an opening extending from said groove through the opposite side thereof, a cutting tool adjustably mounted in said opening and extending into said groove, a reciprocatory block mounted in said groove and having an inclined surface in supporting engagement with said tool, a plate secured to said bar to close said groove and support said block therein, said bar having a part extending transversely to said groove at one end thereof and provided with an opening in line with said groove, a screw rigidly connected with said block and extending loosely through the opening in said transverse part, a rotatable nut threaded on said screw and arranged between said transverse part and an adjacent portion of said bar, said bar having a chip receiving recess immediately in front of said tool and having a second recess in the rear of said tool, and a tool supporting block removably mounted in said second recess and engaging said tool to support the same against rearward movement.

In testimony whereof, I affix my signature.

JOHN E. SCHMELTZER.